BOND FAILURE DETECTION IN LAMINATED STRUCTURES USING VIBRATION RESPONSE
Filed May 20, 1968 2 Sheets-Sheet 1
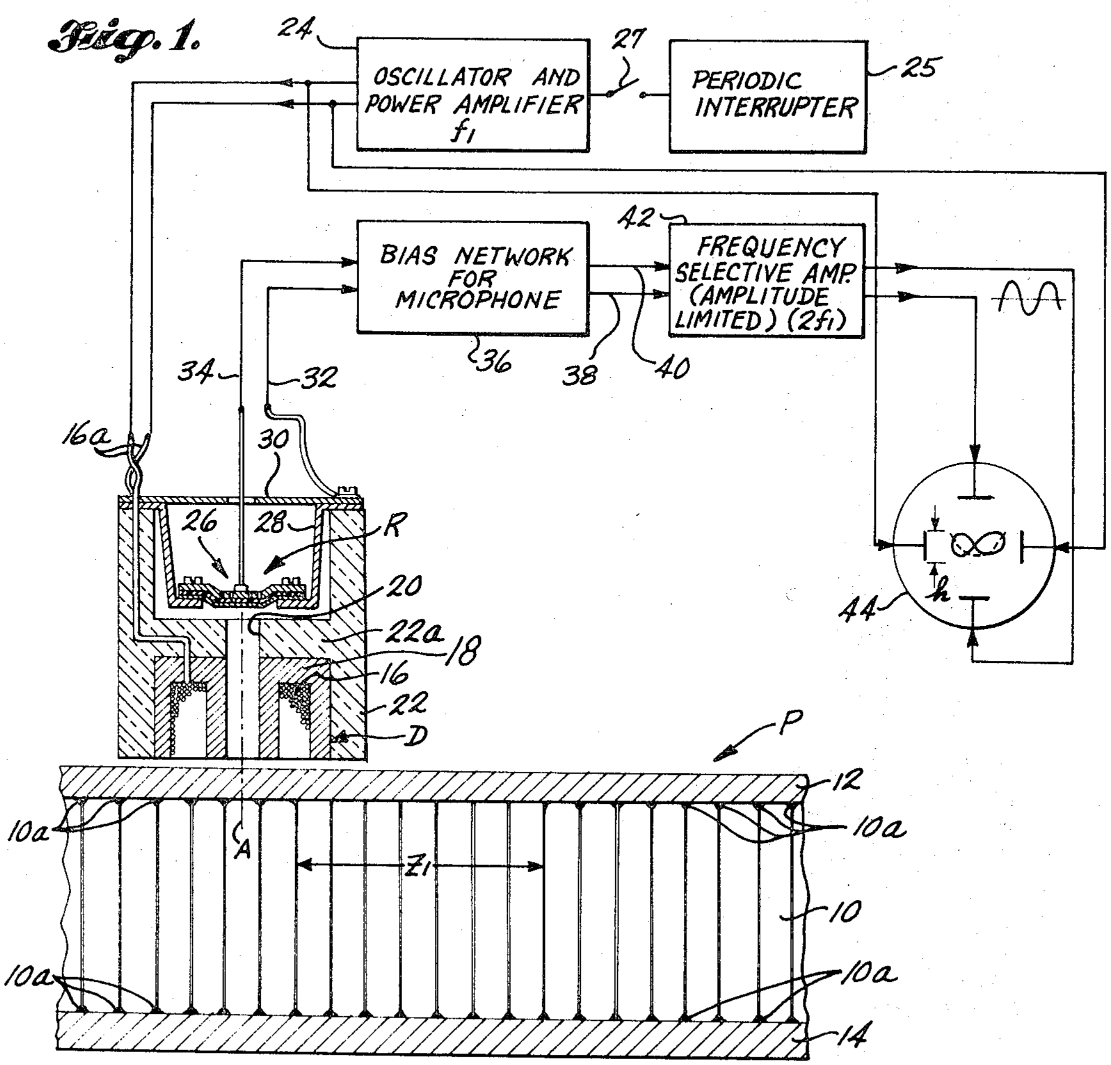
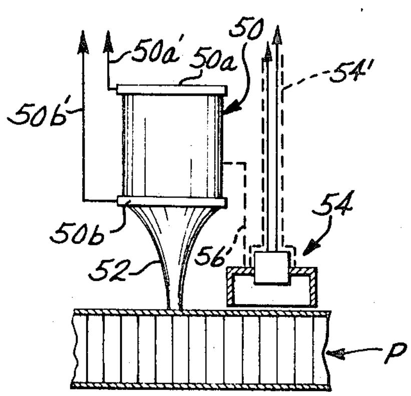
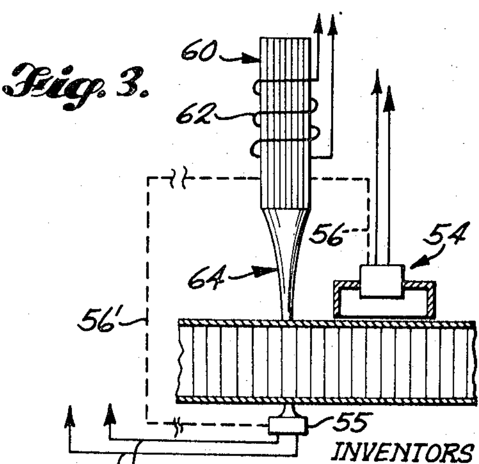
INVENTORS
WAYNE E. WOODMANSEE
LOYD W. GEORGE
BY
Christensen, Sanborn & Matthews
ATTORNEYS BOND FAILURE DETECTION IN LAMINATED STRUCTURES USING VIBRATION RESPONSE
Filed May 20, 1968
Fig. 3A.
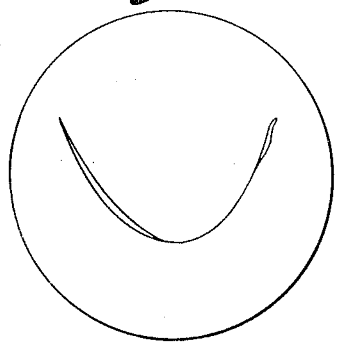
NORMAL
Fig. 4A.
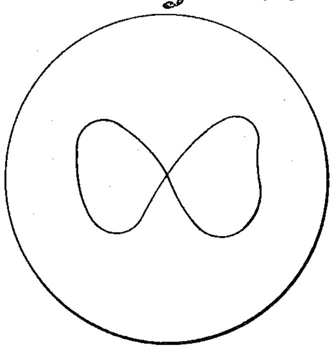
FLAW EDGE
Fig. 5A.
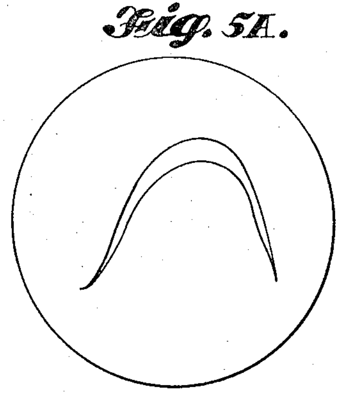
FLAW CENTER
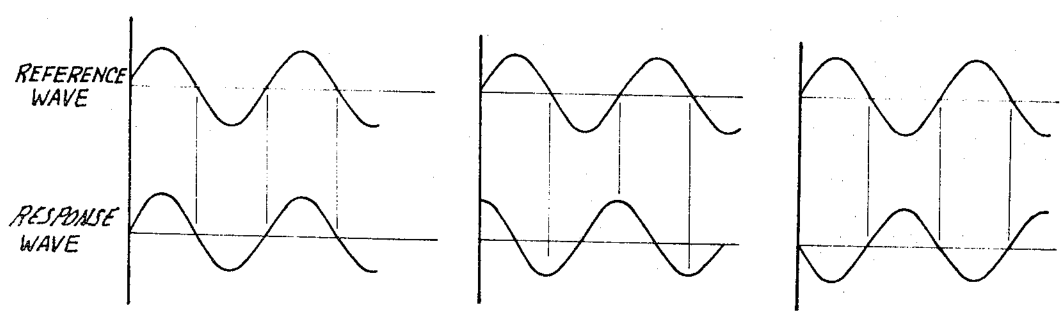
Fig. 3B. Fig. 4B. Fig. 5B.
Fig. 6.
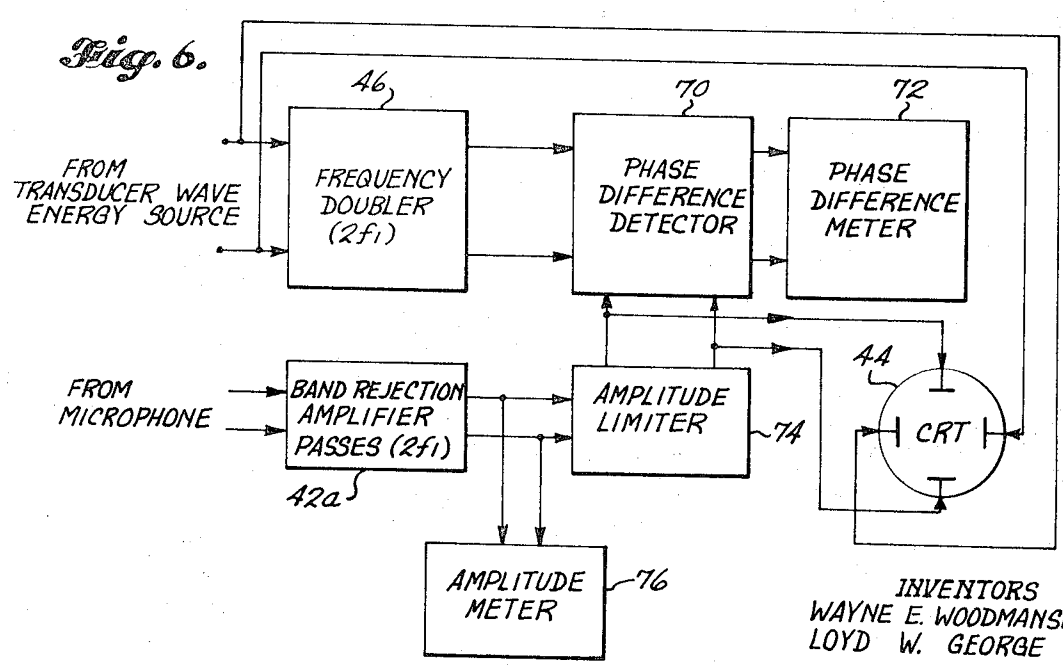
INVENTORS
WAYNE E. WOODMANSEE
LOYD W. GEORGE
BY Christensen, Sanborn & Matthews
ATTORNEYS

United States Patent Office 3,564,903
Patented Feb. 23, 1971

3,564,903

BOND FAILURE DETECTION IN LAMINATED STRUCTURES USING VIBRATION RESPONSE

Wayne E. Woodmansee, Seattle, and Loyd W. George, Algona, Wash., assignors to The Boeing Company, Seattle, Wash., a corporation of Delaware Filed May 20, 1968, Ser. No. 730,280
Int. Cl. G01n *29/04*
U.S. Cl. 73—67.2 10 Claims

ABSTRACT OF THE DISCLOSURE

Bonding flaws in a honeycomb-core laminated structure or the like are determined by comparing phase of the panel's vibrational response to vibration-inducing periodic forces applied to the structure at substantially the same location by a driving transducer and in many cases by simultaneously measuring the amplitude of such vibration response. To compare phase, the electrical output wave from a vibration-detecting transducer is compared with an electrical reference signal, phase-related to the energizing wave for a vibration-inducing transducer. With the latter transducer of a type which vibrates the panel at twice the transducer's energization frequency the panel vibration response signal, however weak, is detected by frequency separation from extraneous energy induced in the detection circuit due to the relatively large flow of power energizing the vibration-inducing transducer in the immediate proximity to the detection transducer. Periodic interruption of transducer energization adds frequency components to the panel vibration stimulus and thereby expands the capability of a given system to provide meaningful tests of panels of widely different materials and construction.

DESCRIPTION

This invention relates to improvements in the detection of flaws in laminated panels and the like, more particularly to the nondestructive testing of honeycomb-core sandwich structures for disbonds between the honeycomb core and skin layers. The techniques disclosed may also be employed to test for crushed or weakened cores and similar defects.

In general, honeycomb-core sandwich structures may comprise various combinations of skin and core materials. For example, the skins may be of metal and the core of metal or of synthetic resin, the skins of synthetic resin and the core of synthetic resin or metal, or various other materials and combinations of materials may be used. The skins may be electrically conductive or nonconductive. They may be nonmagnetic, diamagnetic, or ferromagnetic.

It will be evident, therefore, that some of these materials and combinations of materials rule out use of certain prior flaw detection methods. Further, the presence and location of disbonds between skins and core may not appear at all in certain prior test methods which penetrate the structure merely with fields or other forms of propagative energy. The geometry of a honeycomb core with its pattern of alternatively dense and open or light material creates special problems in flaw detection, especially where resolution is important, such as where a disbond along the juncture between a single web or a few successive webs of the core and the adjoining face ply could be of vital concern. Prior techniques have not afforded an adequate solution to these and similar technical difficulties ro requirements.

One of the broad objects of the present invention, therefore, is to devise a versatile means and technique for detecting the presence and location of disbond flaws and other defects, such as a crushed core condition, in laminated honeycomb-core panels and similar structures. Another object hereof is to devise an improved flaw detection means capable of nondestructive testing of panels and similar structures. A further object is to devise apparatus of this nature suitable for portable, battery-operated applications.

An important object hereof is to devise a consistent and reliable flaw detection system wherein the panel is physically vibrated nondestructively as an inherent part of the test such that those defects or weakened conditions which may impair the ultimate strength and load-assuming capabilities of the panel will reveal themselves to an incipient degree by their effect on the flexure or stress-strain characteristics of the panel, under such vibration yet without thereby extending the defect or weakened condition, and will be unmistakably sensed and identified as to presence and location with a relatively high degree of resolution.

Still another object hereof is to devise a flaw detection system in which panel periphery (edge) effects have minimum influence upon the test results so as to require difficult interpretation of the indications. A related object, therefore, is to devise a test system involving nondestructive panel vibration wherein the stimulus applied to the panel may be localized in a small area thereof and the panel may thus be scanned systemtically so as to test a succession of areas comprising part or substantially all of its total surface. However, it is also an object in this same regard, and as part of the resolution capability and interference-free definition of the detection apparatus, to sense the vibrational response of the panel preferably in the precise locale of the applied vibration stimulus. This requires vibration-inducing and vibration-sensing electro-physical transducer means practically adapted for relative positioning close to one another, preferably in substantially coincident or coaxially superposed relationship. However, inasmuch as the amount of power expended in the vibration-inducing transducer is great in comparison with the relatively weak vibration response signal, it is a purpose hereof to devise a system in which extraneous signals unavoidably induced in the detection apparatus proximate thereto may be eliminated from the detector output. Permitting close relative positioning of the two transducers also serves the related objective of transducer compactness, particularly desirable in portable applications.

In the practice of this invention a honeycomb-core sandwich structure or other laminated panel structure is subjected to transverse vibration-inducing periodic forces by electro-physical transducer means positioned adjacent one side of the structure. In the case of honeycomb-core sandwich structures with an electrically conductive skin, panel vibration is preferably induced by an alternating magnetic field directed into a localized area of the panel by an electro-magnetic coil transducer. The resultant alternating eddy currents induced in the skin are attended by magnetic fields which, by the well known Lenz effect, react with the excitation field and thereby exert the desired vibrational forces on the panel. With panels having diamagnetic or ferromagnetic skins, panel vibration forces arise from magnetic attraction or repulsion, respectively. Magnetostrictive type transducers placed in physical contact with the panel may also be utilized, if desired, such as in cases wherein the panel skin is neither conductive nor magnetically responsive. Whatever form of driving transducer is chosen to vibrate the panel it is important in one aspect of this invention that the effect be such as to vibrate the panel at a frequency twice the electrical wave energy frequency applied to the drive transducer.

With the panel thus caused to vibrate at twice the excitation wave energy frequency, the driving and detecting transducer devices may be mounted in a common housing or in very close proximity one with the other in accordance with certain objectives stated hereinabove. For example, a vibration-detecting microphone may be mounted directly upon the top or back side of a driving transducer electromagnet coil, with the microphone in registry with a sound transmission aperture extending through the center of the coil core, so as to assure detection of the panel's vibration response at the center of drive stimulus applied to the panel area. Frequency filtering of the microphone output signals before application to indicator means associated therewith eleminates extraneously induced signal components occurring at the energizing frequency of the driving transducer while selectively passing to the indicator means the signal component corresponding to the panel vibration frequency and related in its amplitude and phase to vibration response of the panel area being driven. With the transducer drive wave periodically interrupted to add Fourier components, amplitude averaging measurement accompanying phase measurement provides an additional parameter (i.e. spectral spread of panel vibration frequencies) adapting the test to a wider range of panel types.

For critical work it is found that prior vibrational methods of flaw detection, working with vibration amplitude effects, impedance effects, spectrum analysis of shock effects, or similar techniques have not been sufficiently definitive and reliable. In accordance with this invention critical detection of disbonds and other defects during scanning of a panel is based on sensing changes in the panel's vibrational response, both in terms of amplitude and in terms of electrical phase relationship between the filtered transducer output wave and a reference wave, which in turn is phase-related to the driving transducer energization wave but preferably twice its frequency. Moreover, the phase change response at the edge of a flaw area, such as a disbond, can be readily distinguished from that at the center of the area.

In another aspect the invention contemplates pulsed or intermittent continuous-wave energization of the driving transducer so as to minimize energy drain on the power source and thereby render the system suitable for portable battery-powered operation. Pulsed operation also avoids overheating of the driving transducer, though it is compactly made and limited in its capability to dissipate heat, and also eliminates or reduces any tendency for standing-waves to build up in the panel which could influence the test results.

These and other features, objects and advantages of the invention will become more fully evident from the following description with reference to the accompanying drawings.

FIG. 1 is a diagram showing application of the invention in one form to the testing of a honeycomb-core sandwich structure, with the driving and receiving transducer devices commonly housed in coaxial relationship shown cross sectionally, and with the associated electrical circuits shown in block diagram form;

FIG. 2 is a simplified diagram of another transducer system;

FIG. 3 is a simplified diagram showing still another transducer system;

FIGS. 3A, 4A, and 5A illustrate cathode ray tube display patterns (Lissajou figures) as one form of indication by which phase relationship changes may be instantly indicated to detect flaw conditions during transducer scanning movement across the face of a panel;

FIGS. 3B, 4B, and 5B are related reference and detector wave diagrams associated respectively with FIGS. 3A, 4A, and 5A, showing phase relationships associated with the latter figures;

FIG. 6 is a block diagram illustrating an alternative detection circuit arrangement for use in the invention.

As shown in FIG. 1 the honeycomb-core sandwich structure P comprises a double-skin panel with a honeycomb-core layer 10 and skin layers 12 and 14 having their inside faces bonded at 10*a* to the coplanar edges of the matrix of undulating webs which together form the honeycomb. For purposes of this illustration it is assumed that the skin layers 12 and 14 comprise aluminum sheets which, of course, have a high degree of electrical conductivity and essentially nonmagnetic properties. For purposes of describing a flaw detection problem with such a panel structure it is assumed that a disbond exists in a small region $Z_1$ between one face of the honeycomb core and skin sheet 12.

The driving transducer D which induces vibrations in the sandwich structure comprises a multi-turn toroidal conductor coil 16 received in the annular cavity of cup-like cylindrical core body 18 of ferromagnetic material. The coil and core body have a common axis A. The core has an axial bore 20 serving as a sound passage extending between its ends and which registers with a similar bore in the transverse divider wall 22*a* of the tubular housing 22 containing the core and coil assembly in its lower end cavity. Housing 22 is of a dielectric material and serves to support and carry the electrical leads for the coil 16 to an external location as indicated at 16*a*, through which the coil is energized by alternating current at frequency $f_1$ from the oscillator and associated power amplifier unit 24. This frequency may be chosen at any suitable value ranging upwardly well into the ultrasonic range. For most applications choice of frequency is not critical although the dimensions, materials and structural form of panels to be tested have some bearing on the frequency range most suitable for the method. This can be determined readily in a given case by preliminary tests with a variable-frequency oscillator (24) and a representative test specimen wherein a disbond is deliberately created and its effect noted in functioning of the detection system. To enrich the frequency spectrum of panel vibration stimulus an oscillator interrupter 25 may be applied selectively through switch 27 to control the operation of oscillator 24. In essence the interruptor is a periodic on-off control switch for the oscillator. Its use increases the system's versatility to perform defect measurements on a somewhat wider range of panel types and forms due to the wider spectrum of stimulus components applied to the panel when the oscillator 24 is delivering its output wave in periodic bursts rather than uninterruptedly.

An open cavity formed in the upper end of the housing unit 22 receives a microphone 26 mounted overlying and in registry with the sound transmission passageway 20. The microphone in this instance comprises a capacitance type unit. It comprises a metallic cup member 28 having a metal cover 30, with electrical leads 32 and 34 for the microphone connecting its capacitance plate elements in a bias network 36. In this network the microphone capacitance parameter serves as an electrical reactance in circuit with another impedance (not shown), usually a resistance, across which circuit voltage is applied. Changes in capacitive reactance in the microphone responsively to incidence of compressional wave (sound) energy thereon in a well known manner will then produce a corresponding output electrical wave signal in the conductors 38 and 40 leading from the bias network to the tuned or frequency selective amplifier 42. Preferably, this latter unit includes or incorporates a high-pass filter (not shown) or equivalent frequency selection circuit means of any suitable or well known form allowing the microphone output wave to pass while blocking substantially lower frequencies. With the microphone signal containing a component at the panel vibration frequency and a component at half that frequency it is a comparatively simple design problem to select the one while eliminating the other in the amplifier system.

In the described case (i.e. a conductive panel skin) energization of coil 16 at frequency $f_1$ magnetically induces eddy currents in the conductive surface ply 12 which in turn produce alternating magnetic fields which react physically with the alternating induction field created by the coil 16 so as to vibrate the surface ply 12 and thereby the sandwich structure 10, 12, 14 at a frequency $2f_1$. Because of the physical and electrical proximity between the driving coil and its circuits and the microphone and its circuits, the high level of energy transfer in the driving circuit inevitably induces a strong signal at drive frequency $f_1$ in the microphone circuit. However, frequency-selective amplifier circuit 42 rejects this induced signal at frequency $f_1$ while accepting and passing the double-frequency signal at frequency $2f_1$, even though the latter is extremely weak by comparison.

In order to develop a meaningful indication from the microphone output signals corresponding to vibration of the honeycomb-core panel structure the single-frequency output of frequency-selective amplifier 42 is applied to one set of deflection plates of the cathode ray tube 44. A reference wave developed from the oscillator 24 is applied to the opposing set of deflection plates of the cathode ray tube. A Lissajou pattern results on the screen which varies in form in accordance with changing amplitude and phase relationships of the applied deflection voltages. Height "*h*" represents the amplitude response of the panel, whereas the pattern shape varies with the relative phase effect according to established principles in cathode ray tube techniques.

As shown in FIGS. 3B, 5B and 4B the reference wave may be either in phase with the microphone wave, 180° out of phase with it, or at some intermediate phase relationship (shown as 90° by way of example). Assuming constancy of deflection voltage amplitude relationships, the displayed Lissajou patterns relating to FIGS. 3B, 4B and 5B appear as in FIGS. 3A, 4A, and 5A. Through studies of various honeycomb-core sandwich structures it has been found that a normal panel, that is one which does not have a surface disbond between the core layer and the adjacent surface layer will produce a Lissajou pattern on the cathode ray tube screen similar to that depicted in FIG. 3A (dotted line showing in FIG. 1) when the microphone wave and reference wave are cophased. However, as the combined transducer assembly moves to a position centered over the edge of a flaw region such as $Z_1$ a figure eight pattern emerges (FIG. 4A) (solid line shown in FIG. 1). As the transducer assembly moves toward the center of the flaw region where the disbond has occurred, the pattern shape changes on the cathode ray tube screen to that depicted in FIG. 5A, which is essentially an inversion of that shown in FIG. 3A.

In FIG. 2 driving transducer 50 comprises a piezoelectric crystal having electrodes 50*a* and 50*b* on opposite faces energizing conductors 50*a'* and 50*b'* connected with the respective electrodes, and a tapered coupler horn or mechanical impedance transformer device 52 having a narrowed end adapted to be placed in physical contact with a panel P to be tested. A panel vibration detection transducer 54 (i.e. a microphone or other form of electro-physical pick-up) is physically connected by a suitable means 56 to the horn 52 in close proximity to its outer end, both confronting the panel. With a piezoelectric driving transducer the panel will be vibrated at the same frequency as that of the applied electrical energy and not at twice the frequency. Consequently, the frequency separation effect previously mentioned is not afforded with this arrangement and to minimize pick-up in the leads of transducer 54, careful shielding 54' is highly essential.

In the transducer arrangmenet of FIG. 3, however, the frequency doubling effect previously described is afforded, since the illustrated driving transducer 60 comprises a magnetostrictive element and associated energizing coils 62. Coupler horn 64 mounted on the end of the element 60 performs the same function as horn 52 in the previous example, namely to transfer compressional wave energy efficiently from the larger surface area of the vibrative element to a smaller area on the panel's surface. Pick-up transducer 54 is coupled by means 56 in fixed close side-by-side positional relationship to the driving transducer 60. To detect a crushed core condition a second transducer 55 preferably of a surface contact type is positioned directly opposite and in coaxial alignment with transducer 60 by means 56' so as to detect variations in transmission of energy directly through the panel. A separate indicator (not shown) is connected to the leads 55' of pick-up transducer 55. In FIG. 6 (designed for use with transducer arrangements such as those represented by FIGS. 1, 2 and 3) a somewhat more elaborate indicator system is depicted. From pick-up amplifier 42*a*, designed to reject the frequency $f_1$ associated with drive transducer energization, the detected double-frequency panel vibration signal is delivered to a suitable amplitude meter 76 (such as an A-C vacuum tube voltmeter, which will be a root means square averaging meter when the drive oscillator 24 is being operated in the intermittent mode by interrupter 25), also to an amplitude limiter 74. From the latter, the constant-amplitude signal and the double-frequency reference signal from frequency doubler 46 are applied to phase difference detector 70, of any suitable or known type. The signal from limiter 74 is also applied to one set of deflection plates of cathode ray tube indicator 44. The output of detector 70 is indicated on a meter 74, whereas the amplitude-limited signal applied to the cathode ray tube is monitored thereon for phase relationship changes by applying a reference wave at frequency $f_1'$ to the remaining set of deflection plates of the cathode ray tube. The cathode ray tube display therefore comprises the informative Lissajou patterns previously mentioned.

These and other aspects of the invention will be recognized from the foregoing disclosure of the preferred embodiments thereof.

What is claimed is:

1. Apparatus for detecting flaws in laminated panels and the like, comprising a first electro-physical transducer means operatively disposable in relation to a localized area of the panel to induce physical vibrations at a first frequency therein responsively to electrical wave energization of the transducer means at a second frequency which is an integral submultiple of the first frequency, means to energize the first transducer means by an electrical wave at the second frequency, a second electro-physical transducer means proximate to the first transducer means and operatively disposable in relation to the panel to sense and convert vibrations therein to an electrical wave signal, and signal indicator means responsively connected to the second transducer means to indicate said signal, said indicator means including frequency selective means operable to reject signal wave components of said second frequency due to such proximity while passing for indication signal wave components of said first frequency.

2. The apparatus defined in claim 1 adapted for portable operation, wherein the energizing means comprises a battery-powered source of wave energy operable to deliver wave energy to the first transducer means at spaced time intervals.

3. The apparatus defined in claim 1 for operation on laminated panels having an electrically conductive surface ply, wherein the first transducer means comprises an electro-magnetic coil device operable to project an alternating magnetic field into said surface ply.

4. The apparatus defined in claim 1, wherein the first transducer means comprises a magnetostrictive element device operable in physical contact with the panel to exert a pressure stroke against the same on succeeding half-cycles of wave energization of said device.

5. The apparatus defined in claim 1, wherein the signal indicator comprises a means connected for response to signal wave components of the first frequency and a reference wave phase-related to the energizing means and operable thereby to indicate changes in phase relationship between them.

6. The apparatus defined in claim 1, wherein the signal indicator comprises a means connected for response to signal wave components of the first frequency and a reference wave phase-related to the energizing means and operable thereby to indicate changes in phase relationship between them and changes in amplitude of said signal wave components of the first frequency.

7. The apparatus defined in claim 6, wherein the transducer energizing means is operable periodically so as to energize the first transducer by bursts of wave energy and the signal indicator means includes an indicator which averages the amplitude of the signal wave components of the first frequency.

8. The apparatus defined in claim 1, wherein the first transducer means comprise an electro-magnetic coil device operable to project an alternating magnetic field into said panel; and the second transducer means comprises a vibration-sensitive element physically adjacent to the coil device.

9. The apparatus defined in claim 8, wherein the coil device has a central compressional wave energy passage extending through the same transversely to the panel, and the second transducer means comprises a microphone type transducer mounted to overlie the passage in position to respond to such compressional wave energy.

10. A combined driving and sensing transducer assembly for panel testing comprising an electromagnet coil and associated ferromagnetic core having a central passage extending through it within the coil, means to energize the coil with continuous wave energy at one frequency, a vibration-sensitive receiving transducer mounted adjacent to the coil and overlying said passage to detect vibrations transmitted through the same means to respond to receiving transducer vibrations selectively at twice the frequency of energization of said coil, electrical leads extending from the coil and the receiving transducer to their respective energizing and responding means, and means forming a common support for the coil, coil core and receiving transducer physically incorporating the same, in a unitary structure.

References Cited

UNITED STATES PATENTS

| | | | |
|---|---|---|---|
| 2,770,966 | 11/1956 | Halliday et al. | 73—67.9 |
| 2,782,632 | 2/1957 | Klein et al. | 73—67.2 |
| 3,126,579 | 3/1964 | Janszen | 73—67X |
| 3,240,054 | 3/1966 | Roth | 73—67.1 |
| 3,470,734 | 10/1969 | Agdur et al. | 73—32 |

FOREIGN PATENTS

| | | |
|---|---|---|
| 4,415,948 | 8/1966 | Japan. |
| 129,059 | 11/1959 | U.S.S.R. |
| 151,720 | 10/1961 | U.S.S.R. |

OTHER REFERENCES

Hughes et al.: "Evaluation of Bond Quality . . .", Nondestructive Testing, Nov.–Dec. 1959, pp. 373–377.

RICHARD C. QUEISSER, Primary Examiner

A. E. KORKOSZ, Assistant Examiner

U.S. Cl. X.R.

73—67.1

PO-1050
(5/69)

UNITED STATES PATENT OFFICE
CERTIFICATE OF CORRECTION

Patent No. 3,564,903 Dated February 23, 1971

Inventor(s) W. E. Woodmansee et al

It is certified that error appears in the above-identified patent and that said Letters Patent are hereby corrected as shown below:

Column 8, line 1, after "same" insert a comma --,--.

Signed and sealed this 6th day of July 1971.

(SEAL)
Attest:

EDWARD M.FLETCHER,JR.
Attesting Officer

WILLIAM E. SCHUYLER,
Commissioner of Pate